UNITED STATES PATENT OFFICE.

PAUL KARRER, OF FRANKFORT-ON-THE-MAIN, GERMANY, ASSIGNOR TO FARBWERKE VORM. MEISTER LUCIUS & BRÜNING, OF HÖCHST-ON-THE-MAIN, GERMANY, A CORPORATION OF GERMANY.

COMPLEX ARSENO COMPOUNDS AND PROCESS OF MAKING SAME.

1,214,924.  Specification of Letters Patent.  Patented Feb. 6, 1917.

No Drawing.  Application filed December 10, 1915.  Serial No. 66,097.

*To all whom it may concern:*

Be it known that I, PAUL KARRER, Ph. D., chemist, a citizen of the Republic of Switzerland, residing at Frankfort-on-the-Main, Germany, have invented certain new and useful Improvements in Complex Arseno Compounds and Processes of Making Same, of which the following is a specification.

I have found that compounds possessing very valuable therapeutic properties for the treatment of infectious diseases are obtained by getting together in solution compounds containing the atomic complex:

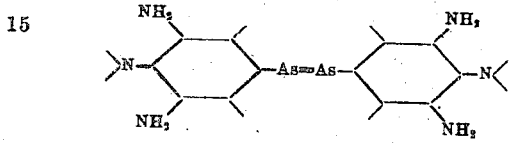

as hexaminoarsenobenzene and derivatives thereof, with 3.3¹-diamino-4.4¹-dioxyarsenobenzene. The solution thus obtained no longer contains the primary products but compounds which are distinguished from the hexaminoarsenobenzene and its derivatives by their solubility in caustic soda lye, and from the diamino-dioxyarsenobenzene by their solubility in sodium bicarbonate.

The new compounds can be separated from the solution as hydrochlorids which form yellowish-white flakes. These chlorids are readily soluble in water and diluted hydrochloric acid, insoluble in ether and, as above mentioned, soluble in an excess of sodium bicarbonate and diluted caustic soda lye. From the solution of the hydrochlorids the free compounds are precipitated in the form of yellowish flakes.

It cannot be decided at present what constitution is to be attributed to these compounds, but they may be regarded as complex arseno-compounds of higher molecular weight.

The following example will illustrate my invention:

2 grams of 3.4.5.3¹.4¹.5¹-hexaminoarsenobenzene hydrochlorid and 1.6 grams of 3.3¹-diamino-4.4¹-dioxyarsenobenzene hydrochlorid are dissolved together in 100 cc. of water and heated to about 80° C. The solution thus obtained is then poured into 400 cc. of glacial acetic acid, whereupon the new hydrochlorid precipitates in the form of yellowish white flakes. The new compound is readily soluble in diluted hydrochloric acid, it is distinguished from hexaminoarsenobenzene by its solubility in caustic soda lye and also from diaminodioxyarsenobenzene by its solubility in sodium bicarbonate.

It is not necessary to heat the aqueous solution to 80° C., as the reaction also takes place at ordinary temperature if the mixture is allowed to stand for some time.

Having now described my invention, what I claim is:

1. The process of preparing complex arseno-compounds, which consists in getting together in solution compounds containing the atomic complex:

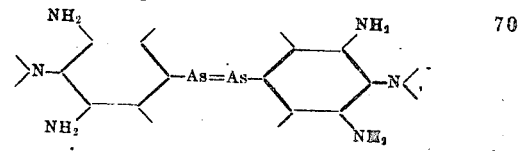

as hexaminoarsenobenzene and derivatives thereof, with 3.3¹-diamino-4.4¹-dioxyarsenobenzene.

2. The process of preparing complex arseno-compounds, which consists in dissolving in water 3.3¹-4.4¹.5.5¹-hexaminoarsenobenzene together with 3.3¹-diamino-4.4¹-dioxyarsenobenzene, both in the form of their hydrochlorids, and gently heating this solution.

3. As new products, the complex arseno compounds, wherein a body containing the atomic complex:

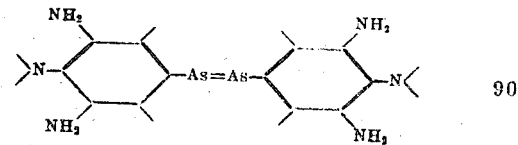

is combined with 3.3¹-diamino-4.4¹-dioxyarsenobenzene; said compounds being soluble in caustic soda lye and sodium bicarbonate, in the form of their hydrochlorids also soluble in water, insoluble in ether.

4. As a new product, a complex arseno compound, wherein hexaminoarsenobenzene is combined with 3.3¹-diamino-4.4¹-dioxyarsenobenzene; being soluble in caustic soda lye and sodium bicarbonate, in the form of its hydrochlorid also soluble in water, almost insoluble in alcohol, insoluble in ether.

In testimony whereof I affix my signature in presence of two witnesses.

PAUL KARRER.

Witnesses:
  JEAN GRUND,
  CARL GRUND.